US012434766B2

(12) United States Patent
Seegmiller et al.

(10) Patent No.: US 12,434,766 B2
(45) Date of Patent: Oct. 7, 2025

(54) METHODS AND SYSTEMS FOR LANE CHANGES USING A MULTI-CORRIDOR REPRESENTATION OF LOCAL ROUTE REGIONS

(71) Applicant: FORD GLOBAL TECHNOLOGIES, LLC, Dearborn, MI (US)

(72) Inventors: Neal Seegmiller, Pittsburgh, PA (US); Christopher Cunningham, Pittsburgh, PA (US); Ramadev Burigsay Hukkeri, Pittsburgh, PA (US); Thomas Petroff, Gibsonia, PA (US); Albert Costa, Pittsburgh, PA (US)

(73) Assignee: Ford Global Technologies, LLC, Dearborn, MI (US)

( * ) Notice: Subject to any disclaimer, the term of this patent is extended or adjusted under 35 U.S.C. 154(b) by 359 days.

(21) Appl. No.: 17/811,164

(22) Filed: Jul. 7, 2022

(65) Prior Publication Data

US 2022/0340201 A1 Oct. 27, 2022

Related U.S. Application Data

(63) Continuation of application No. 16/597,273, filed on Oct. 9, 2019, now Pat. No. 11,414,130.

(51) Int. Cl.
*B60W 30/00* (2006.01)
*B60W 30/18* (2012.01)
*B62D 15/02* (2006.01)
*G01C 21/36* (2006.01)
(Continued)

(52) U.S. Cl.
CPC ... *B62D 15/0255* (2013.01); *B60W 30/18163* (2013.01); *G01C 21/3626* (2013.01); *G08G 1/163* (2013.01); *G08G 1/164* (2013.01); *H04W 4/02* (2013.01); *B60W 2554/80* (2020.02); *B60W 2556/50* (2020.02)

(58) Field of Classification Search
None
See application file for complete search history.

(56) References Cited

U.S. PATENT DOCUMENTS

| 10,042,362 B2 | 8/2018 | Fairfield et al. |
| 10,137,896 B2 | 11/2018 | Zhuang et al. |
| 2015/0345971 A1 | 12/2015 | Meuleau et al. |

(Continued)

FOREIGN PATENT DOCUMENTS

| CN | 105675000 A | 6/2016 |
| KR | 20190067574 A | 6/2019 |
| WO | 2018235159 A1 | 12/2018 |

*Primary Examiner* — James M Mcpherson
(74) *Attorney, Agent, or Firm* — Frank A. MacKenzie; Brooks Kushman P.C.

(57) ABSTRACT

Methods and systems for maneuvering an autonomous vehicle are disclosed. The methods include generating a multi-corridor representation corresponding to a local region around the autonomous vehicle while travelling on a route, and using the multi-corridor representation and perception data corresponding to the local region to generate a trajectory for the autonomous vehicle to traverse the local region. The multi-corridor representation includes a plurality of adjacent corridors that each include one or more lane segments of a road network. A location of executing a lane change along the route is determined dynamically during a trajectory generation phase based on the perception data.

19 Claims, 9 Drawing Sheets

(51) Int. Cl.
*G08G 1/16* (2006.01)
*H04W 4/02* (2018.01)

(56) References Cited

U.S. PATENT DOCUMENTS

| | | |
|---|---|---|
| 2018/0099676 A1* | 4/2018 | Goto .................... B60W 30/10 |
| 2018/0273032 A1 | 9/2018 | Yang et al. |
| 2019/0004527 A1* | 1/2019 | Fairfield .......... G08G 1/096833 |
| 2019/0016338 A1 | 1/2019 | Ishioka et al. |
| 2019/0071092 A1 | 3/2019 | Ma et al. |
| 2020/0398894 A1* | 12/2020 | Hudecek ............. G05D 1/0214 |
| 2021/0163010 A1* | 6/2021 | Takabayashi ............ G08G 1/16 |

* cited by examiner

METHODS AND SYSTEMS FOR LANE CHANGES USING A MULTI-CORRIDOR REPRESENTATION OF LOCAL ROUTE REGIONS

CROSS-REFERENCE AND CLAIM OF PRIORITY

This patent application is a Continuation of and claims priority to U.S. patent application Ser. No. 16/597,273 filed Oct. 9, 2019, now U.S. Pat. No. 11,414,130 issued on Aug. 16, 2022, the entirety of the priority application is incorporated herein by reference.

BACKGROUND

Successful design and deployment of autonomous vehicles (AV) requires finding an optimal road/lane-level path from the AV's current location to a specified destination in a map including a road network. Routes typically require lane changes, for example, the AV must merge into a leftmost lane to make a left turn, or a rightmost lane to make a right turn. There may be a window spanning several city blocks in which the lane change is permissible.

Existing methods use a representation of the road network as a graph and search the graph for a single optimal path, which may include locations at which the AV may be allowed to make a lane change. However, it may not be possible at the routing stage to determine the exact optimal location where the AV may execute a lane change maneuver because at that time there is insufficient context or information about real-time traffic conditions and other factors that may affect the feasibility of lane change maneuvers. Those conditions are often only observed by the AV when the AV arrives at a location and can actually perceive them. Specifically, lane change locations selected at the routing stage are likely inaccurate, and a planned lane change maneuver may fail. When an AV is unable to make a planned lane change maneuver, without a contingency in place, the AV might operate without a route for at least some time while waiting to be re-routed. This may lead to an unexpected stop at the end of the route, or traversal into an undesirable part of the map that is difficult to route out of. The same problem may occur if the AV fails to make a routed turn through an intersection. Finally, in addition to not accurately knowing where the AV can execute a lane change, often times the route planner also does not know a lane change will be necessary, such as to navigate around a double-parked vehicle that is unknown at the route planning stage.

One existing solution is to dynamically re-route on a local region of the lane graph when blockages or other conditions are perceived that make the original route infeasible. However, a disadvantage of this approach is that the lane graph represents possible lane change locations discretely, and such discretization does not account for perception. Undersampling in the lane graph can cause a feasible lane change window to be missed, or a suboptimal lane change location to be chosen. The discretization of the lane graph is also not suitable for continuous trajectory planning. For example, the lane segments can be arbitrarily short or long, may break at locations not meaningful for trajectory planning, and/or may lack breaks at locations that are meaningful (such as perceived blockages).

This document describes methods and systems that are directed to addressing the problems described above, and/or other issues.

SUMMARY

In one or more scenarios, methods and systems for maneuvering an autonomous vehicle are disclosed. In one scenario, the methods may include generating a multi-corridor representation corresponding to a local region around the autonomous vehicle while travelling on a route, and using the multi-corridor representation and perception data corresponding to the local region to generate a trajectory for the autonomous vehicle to traverse the local region. The multi-corridor representation may include a plurality of adjacent corridors that each include one or more lane segments of a road network. A location of executing a lane change along the route can then be determined dynamically during a trajectory generation phase based on the perception data. Optionally, a reference path may be generated along which the autonomous vehicle will travel in each corridor.

In certain implementations, the one or more lane segments of the road network may be stitched together without lane demarcation. Optionally, a boundary between a pair of adjacent corridors of the plurality of adjacent corridors can include one or more permissible lane change regions where the autonomous vehicle can execute the lane change. In such scenarios, the trajectory may be generated by receiving a static cost associated with each of the one or more lane segments that is indicative of a lane change to be executed by the autonomous vehicle while travelling on the route, and using the computed static cost to identify the one or more permissible lane change regions and associating them with a continuous cost-to-go. Optionally, the static cost associated with a lane segment may be based on information included in a road network map without taking into account the perception data.

Additionally and/or alternatively, generating the trajectory may include generating a stay-in-lane candidate trajectory for the autonomous vehicle to stay in a current corridor in the local region, generating one or more lane change candidate trajectories for the autonomous vehicle to change from the current corridor to a destination corridor using a permissible lane change region between the current corridor and the destination corridor, using the perception data and a continuous cost-to-go associated with the permissible lane change region to determine a dynamic cost associated with the stay-in-lane candidate trajectory and the one or more lane change candidate trajectories, and identifying the trajectory for the autonomous vehicle to traverse the local region as a candidate trajectory that has a minimum dynamic cost.

In some embodiments, the one or more the one or more lane segments of the road networks may be identified by generating the route comprising a plurality of consecutive lane segments, identifying a neighboring lane segment corresponding to one or more of the plurality of consecutive lane segments, and identifying the one or more lane segments as a subset of the plurality of consecutive lane segments and the neighboring lane segment, the subset being associated with the local region.

In some implementations, the generation of the multi-corridor representation and the generation of the trajectory steps may be repeated for a plurality of local regions until the autonomous vehicle reaches a destination.

Implementing systems of the above-described methods for maneuvering an autonomous vehicle can include, but are not limited to, a processor and a non-transitory computer-readable storage medium comprising programming instructions that are configured to cause the processor to implement the methods. Optionally, the programming instructions may be included in a computer program product.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to." Definitions for additional terms that are relevant to this document are included at the end of this Detailed Description.

Figure 1:
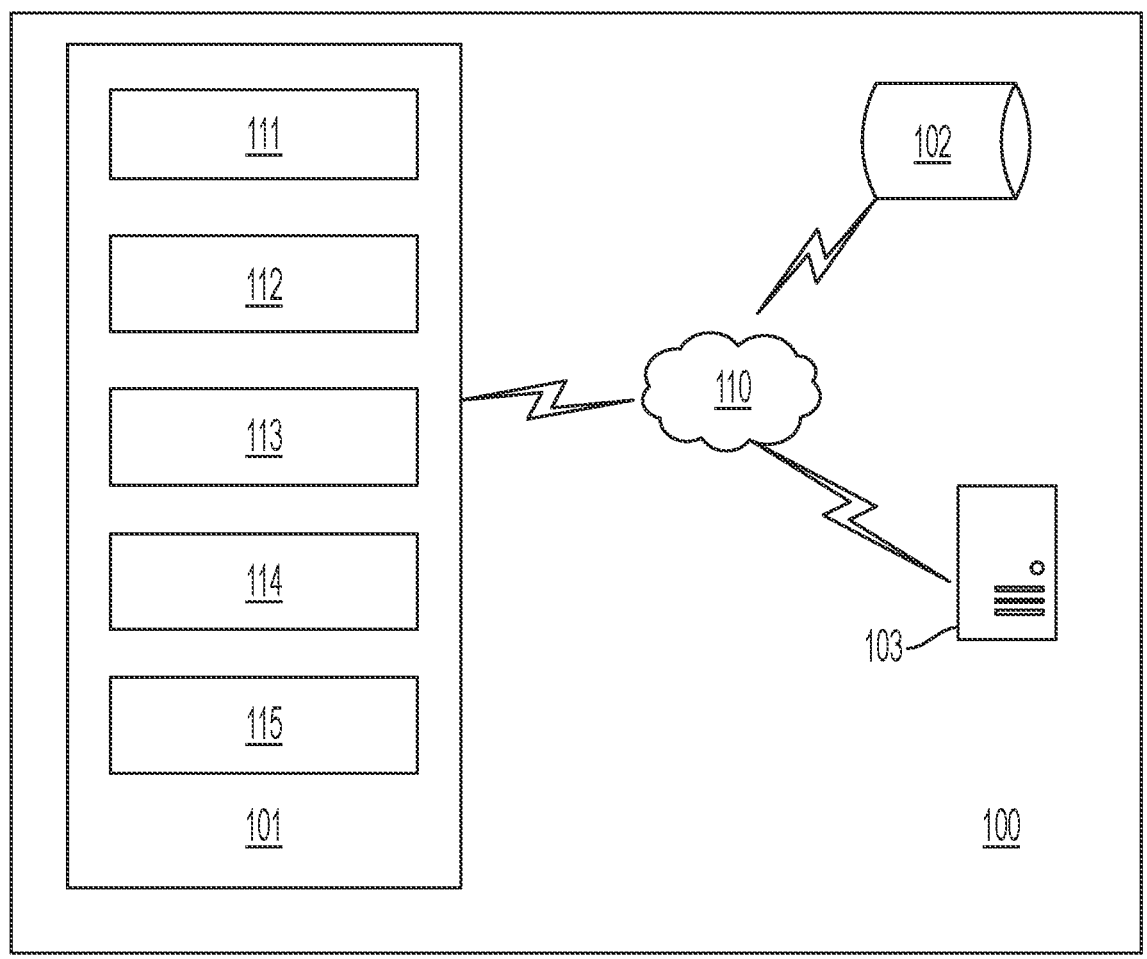
FIG. 1 illustrates an example system that includes an autonomous vehicle.

FIG. 1 is a block diagram illustrating an example system 100 that includes an autonomous vehicle 101 in communication with one or more data stores 102 and/or one or more servers 103 via a network 110. Although there is one autonomous vehicle shown, multiple autonomous vehicles may be coupled to each other and/or coupled to data stores 102 and/or servers 103 over network 110. Network 110 may be any type of network such as a local area network (LAN), a wide area network (WAN) such as the Internet, a cellular network, a satellite network, or a combination thereof, and may be wired or wireless. Data store(s) 102 may be any kind of data stores such as, without limitation, map data stores, traffic information data stores, user information data stores, point of interest data store(s), or any other type of content data store(s). Server(s) 103 may be any kind of servers or a cluster of servers, such as, without limitation, Web or cloud servers, application servers, backend servers, or a combination thereof.

As illustrated in FIG. 1, the autonomous vehicle 101 may include a sensor system 111, a vehicle controller 112, a vehicle control system 113, a communications interface 114, and a user interface 115. Autonomous vehicle 101 may further include certain components (not shown here) included in vehicles, such as, an engine, wheels, steering wheel, transmission, etc., which may be controlled by vehicle control system 112 using a variety of communication signals and/or commands, such as, for example, acceleration signals or commands, deceleration signals or commands, steering signals or commands, braking signals or commands, etc.

The sensor system 111 may include one or more sensors that are coupled to and/or are included within the autonomous vehicle 101. Examples of such sensors include, without limitation, a Light Detection and Ranging (LiDAR) system, a Radio Detection and Ranging (RADAR) system, one or more cameras (e.g., visible spectrum cameras, infrared cameras, etc.), temperature sensors, position sensors, location sensors (e.g., global positioning system (GPS), etc.), fuel sensors, speed sensors, odometer sensor, motion sensors (e.g., inertial measurement units (IMU), accelerometer, gyroscope, etc.), object detection sensors such as one or more cameras humidity sensors, environmental sensors (e.g., a precipitation sensor and/or ambient temperature sensor) occupancy sensors, or the like. The sensor data can include information that describes the location of objects within the surrounding environment of the autonomous vehicle 101, information about the environment itself, information about the motion of the autonomous vehicle 101, information about a route of the autonomous vehicle, or the like.

Figure 2:
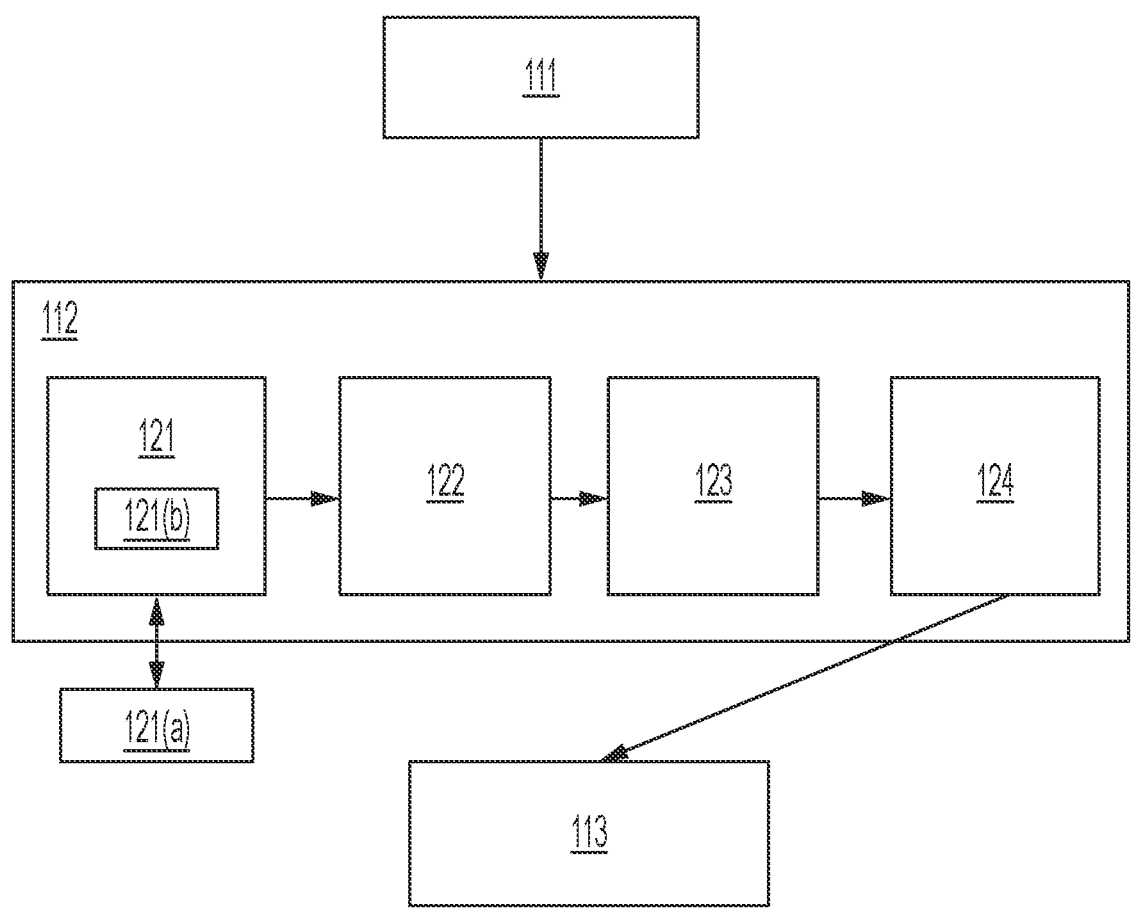
FIG. 2 illustrates block diagram of various components of an example controller of an autonomous vehicle.

As shown in FIG. 2, the vehicle controller 112 may receive data collected by the sensor system 111 and analyze it to provide one or more vehicle control instructions to the vehicle control system 113. The vehicle controller 112 may include, without limitation, a location subsystem 121, a perception subsystem 122, a prediction subsystem 123, and a motion planning subsystem 124.

The location subsystem 121 may include and/or may retrieve map data from a map data store 121(a) that provides detailed information about the surrounding environment of the autonomous vehicle. The map data can provide information regarding: the identity and location of different roadways, road segments, buildings, or other items; the location and directions of traffic lanes (e.g., the location and direction of a parking lane, a turning lane, a bicycle lane, or other lanes within a particular roadway); traffic control data (e.g., the location and instructions of signage, traffic lights, or other traffic control devices); and/or any other map data that provides information that assists the vehicle controller 112 in analyzing the surrounding environment of the autonomous vehicle. In certain embodiments, the map data may also include reference path information that correspond to common patterns of vehicle travel along one or more lanes such that the motion of the object is constrained to the reference path (e.g., locations within traffic lanes on which an object commonly travels). Such reference paths may be pre-defined such as the centerline of the traffic lanes. Optionally, the reference path may be generated based on a historical observations of vehicles or other objects over a period of time (e.g., reference paths for straight line travel, lane merge, a turn, or the like).

In certain embodiments, the location subsystem 121 may also include and/or may receive information relating to the trip or route of a user, real-time traffic information on the route, or the like.

The location subsystem 121 may include and/or may be in communication with a routing module 121(b) that generates a navigation route from a start position to a destination position for an autonomous vehicle. The routing module 112(b) may access the map data store 112(a) to identify possible routes and road segments that a vehicle can travel on to get from the start position to the destination position. The routing module 112(b) may score the possible routes and identify a preferred route to reach the destination. For example, the routing module 112(b) may generate a navigation route that minimizes Euclidean distance traveled or other cost function during the route, and may further access the traffic information and/or estimates that can affect an amount of time it will take to travel on a particular route. Depending on implementation, the routing module 112(b) may generate one or more routes using various routing methods, such as Dijkstra's algorithm, Bellman-Ford algorithm, or other algorithms. The routing module 112(b) may also use the traffic information to generate a navigation route that reflects expected conditions of the route (e.g., current day of the week or current time of day, etc.), such that a route generated for travel during rush-hour may differ from a route generated for travel late at night. The routing module 112(b) may also generate more than one navigation route to a destination and send more than one of these navigation routes to a user for selection by the user from among various possible routes.

Based on the sensor data provided by sensor system 111 and information obtained by the location subsystem 121, the perception subsystem 122 may determine perception information of the surrounding environment of the autonomous vehicle 101 during travel from the start position to the destination along the preferred route. The perception information may represent what an ordinary driver would perceive in the surrounding environment of a vehicle. The perception data may include information relating to one or more objects in the environment of the autonomous vehicle 101. For example, the perception subsystem 122 may process sensor data (e.g., LiDAR or RADAR data, camera images, etc.) in order to identify objects and/or features in the environment of autonomous vehicle. The objects may include traffic signals, roadway boundaries, other vehicles, pedestrians, and/or obstacles, etc. The perception subsystem 122 may use any now or hereafter known object recognition algorithms, video tracking algorithms, and computer vision algorithms (e.g., track objects frame-to-frame iteratively over a number of time periods) to determine the perception.

In some embodiments, the perception subsystem 122 may also determine, for one or more identified objects in the environment, the current state of the object. The state information may include, without limitation, for each object: current location; current speed and/or acceleration, current heading; current orientation; size/footprint; type (e.g., vehicle vs. pedestrian vs. bicycle vs. static object or obstacle); and/or other state information.

The prediction subsystem 123 may predict the future locations, trajectories, and/or actions of the objects based at least in part on perception information (e.g., the state data for each object) received from the perception subsystem 122, the location information received from the location subsystem 121, the sensor data, and/or any other data that describes the past and/or current state of the objects, the autonomous vehicle 101, the surrounding environment, and/or their relationship(s). For example, if an object is a vehicle and the current driving environment includes an intersection, prediction subsystem 123 may predict whether the object will likely move straight forward or make a turn. If the perception data indicates that the intersection has no traffic light, prediction subsystem 123 may also predict whether the vehicle may have to fully stop prior to enter the intersection. Such predictions may be made for a given time horizon (e.g., 5 seconds in the future). In certain embodiments, the prediction subsystem 123 may provide the predicted trajectory(ies) for each object to the motion planning subsystem 124.

The motion planning subsystem 124 may determine a motion plan for the autonomous vehicle based on the perception data and/or the prediction data. Specifically, given predictions about the future locations of proximate objects and other perception data, the motion planning subsystem 124 can determine a motion plan for the autonomous vehicle 101 that best navigates the autonomous vehicle 101 relative to the objects at their future locations.

In one or more embodiments, the motion planning subsystem 124 may receive the predictions from the prediction 123 and make a decision regarding how to handle objects in the environment of the autonomous vehicle 101. For example, for a particular object (e.g., a vehicle with a given speed, direction, turning angle, etc.), motion planning subsystem 124 decides whether to overtake, yield, stop, and/or pass based on, for example, traffic conditions, map data, state of the autonomous vehicle, etc. In some embodiments, for a given object, the motion planning subsystem 124 may decide what to do with the object and may determine how to do it. For example, for a given object, the motion planning subsystem 124 may decide to pass the object, and then may determine whether to pass on the left side or right side of the object (including motion parameters such as speed, and lane change decisions). The motion planning subsystem 124 may also assess the risk of a collision between a detected object and the autonomous vehicle 101. If the risk exceeds an acceptable threshold, it may determine whether the collision can be avoided if the autonomous vehicle follows a defined vehicle trajectory and/or implements one or more dynamically generated emergency maneuvers is performed in a pre-defined time period (e.g., N milliseconds). If the collision can be avoided, then the controller 120 may transmit appropriate control instructions to the vehicle control system 113 for execution to perform a cautious maneuver (e.g., mildly slow down, accelerate, change lane, or swerve). In contrast, if the collision cannot be avoided, then the controller 120 may transmit appropriate control instructions to the vehicle control system 113 for execution of an emergency maneuver (e.g., brake and/or change direction of travel).

Furthermore, the motion planning subsystem also plans a trajectory ("trajectory generation") for the autonomous vehicle 101 to travel on a given route (e.g., an optimal route through the road network generated by the routing module 112(b)). The trajectory specifies the spatial path for the autonomous vehicle as well as a velocity profile. The controller converts the trajectory into control instructions for the vehicle control system, including but not limited to throttle/brake and steering wheel angle commands. Trajectory generation may involve making decisions relating to lane changes, such as, without limitation, whether a lane change is required, where to perform a lane change, and when to perform a lane change. Specifically, one objective of the motion planning subsystem 124 is to generate a trajectory for motion of the vehicle from a start position to a destination on the optimal route, taking into account the perception and prediction data. The motion planning subsystem 124 may generate the trajectory by performing route expansion and generating multi-corridor representation of local route region to, for example, support lane changes, alternate route decisions, etc. The motion planning subsystem may use the preferred route information provided by the routing module 112(b) in combination with perception and prediction data to dynamically generate the multi-corridor representations, as discussed below.

As discussed above, planning and control data regarding the movement of the autonomous vehicle is generated by the motion planning subsystem 124 of the controller 120 that is transmitted to the vehicle control system 113 for execution. The vehicle control system 113 may, for example, control braking via a brake controller; direction via a steering controller; speed and acceleration via a throttle controller (in a gas-powered vehicle) or a motor speed controller (such as a current level controller in an electric vehicle); a differential gear controller (in vehicles with transmissions); and/or other controllers.

In the various embodiments discussed in this document, the description may state that the vehicle or a controller included in the vehicle (e.g., in an on-board computing system) may implement programming instructions that cause the controller to make decisions and use the decisions to control operations of one or more vehicle systems via the vehicle control system of the vehicle. However, the embodiments are not limited to this arrangement, as in various embodiments the analysis, decision making and or operational control may be handled in full or in part by other computing devices that are in electronic communication with the vehicle's on-board controller and/or vehicle control system. Examples of such other computing devices include an electronic device (such as a smartphone) associated with a person who is riding in the vehicle, as well as a remote server that is in electronic communication with the vehicle via a wireless communication network. The processor of any such device may perform the operations that will be discussed below.

Referring back to FIG. 1, the communications interface 114 may be configured to allow communication between autonomous vehicle 101 and external systems, such as, for example, external devices, sensors, other vehicles, servers, data stores, databases etc. Communications interface 114 may utilize any now or hereafter known protocols, protection schemes, encodings, formats, packaging, etc. such as, without limitation, Wi-Fi, an infrared link, Bluetooth, etc. User interface system 115 may be part of peripheral devices implemented within vehicle 101 including, for example, a keyword, a touch screen display device, a microphone, and a speaker, etc.

Human drivers do not commit to an exact lane change location or decision far in advance (for example, at the time of identifying a preferred route). Rather, they consider a window over which the lane change is permitted, and take the best opportunity within that window based on observed conditions. For an autonomous vehicle to do the same, it must delay the decision about the exact lane change location until the trajectory generation stage, when perception data (e.g., conditions such as the gaps between other road users) and prediction data about the autonomous vehicle's environment is available.

Figure 3:
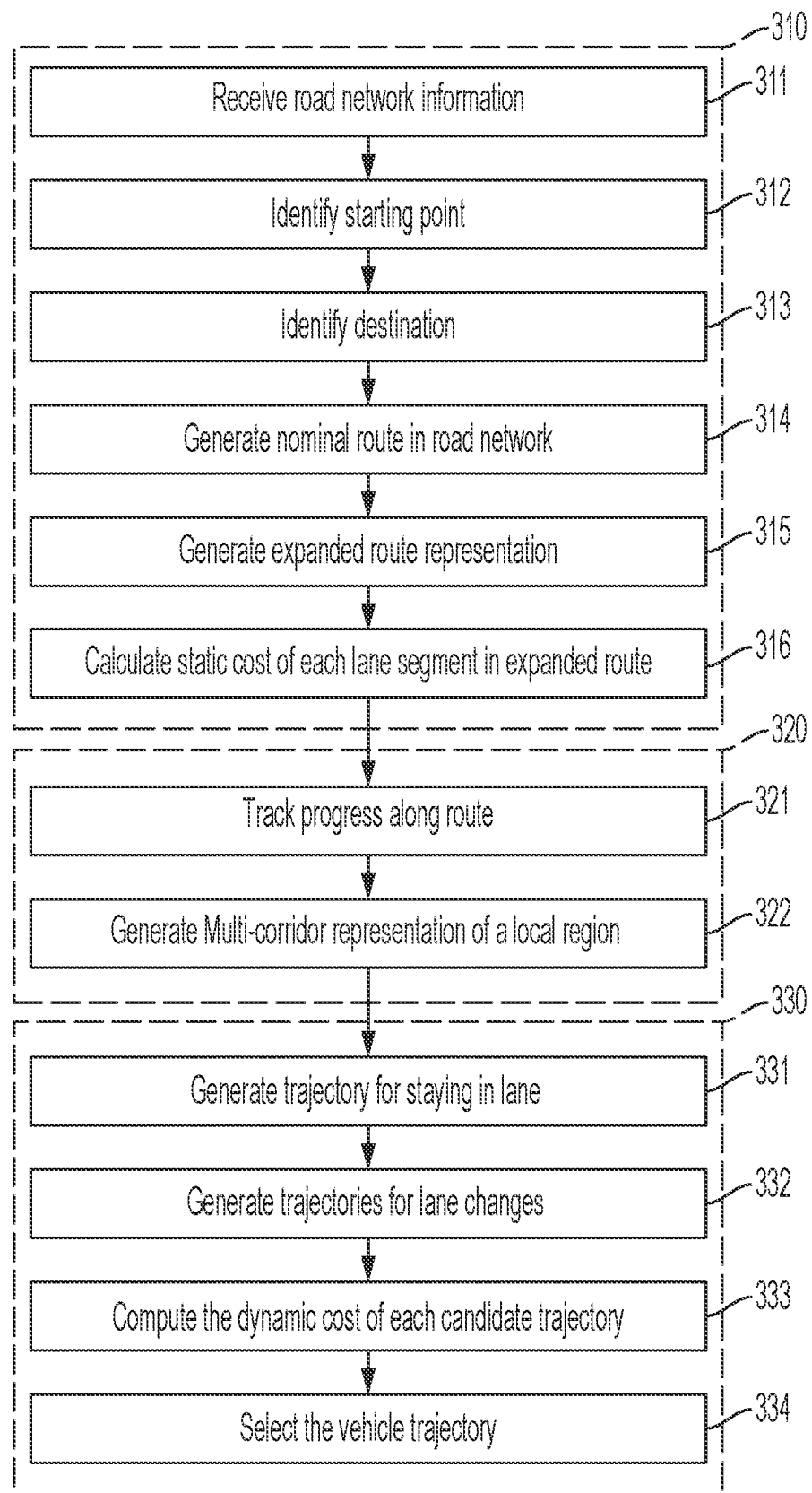
FIG. 3 illustrates a flowchart of an example method for trajectory generation using generation of multi-corridor representation of a local route region.

Referring now to FIG. 3, a flowchart illustrating an example method for trajectory generation using route expansion and generation of multi-corridor representation of a local route region is shown.

As shown in FIG. 3, trajectory generation includes 3 distinct phases that may be performed independently of each other and at different frequencies. The first phase 310 may include generation of a route on which the autonomous vehicle may travel from a starting point to a destination point, using a road network. The system may generate a route every time a new route is requested by a user. Alternatively and/or additionally, the system may generate a route automatically if, for example, the autonomous vehicle fails to follow a previously generated route, the previously generated route is determined to be no longer feasible (e.g., a road block such as an accident occurred on the previously generated route), based on user profile (for example, if a user always travels from a starting point to a destination point at certain time during the date, based on user calendar entries, etc.).

For generation of a route, the system may receive (311) road network information (e.g., a map) corresponding to a geographical area of the interest from, for example, a map data store. In some embodiments, the road network information may include a road network map of the geographical location. A road network map may be a graphical representation of a collection of interconnected roads included in the geographical area, and may include roads, lanes, and lane segments. A road comprises one or more adjacent lanes, which may be divided by lane markings and are intended for a single line of traffic. Lanes may be split longitudinally at lane segments, sometimes at locations meaningful for motion planning (such as the start/end of an intersection) and/or at other locations that may not be meaningful for motion planning as an artifact of the map generation process.

Figure 4:
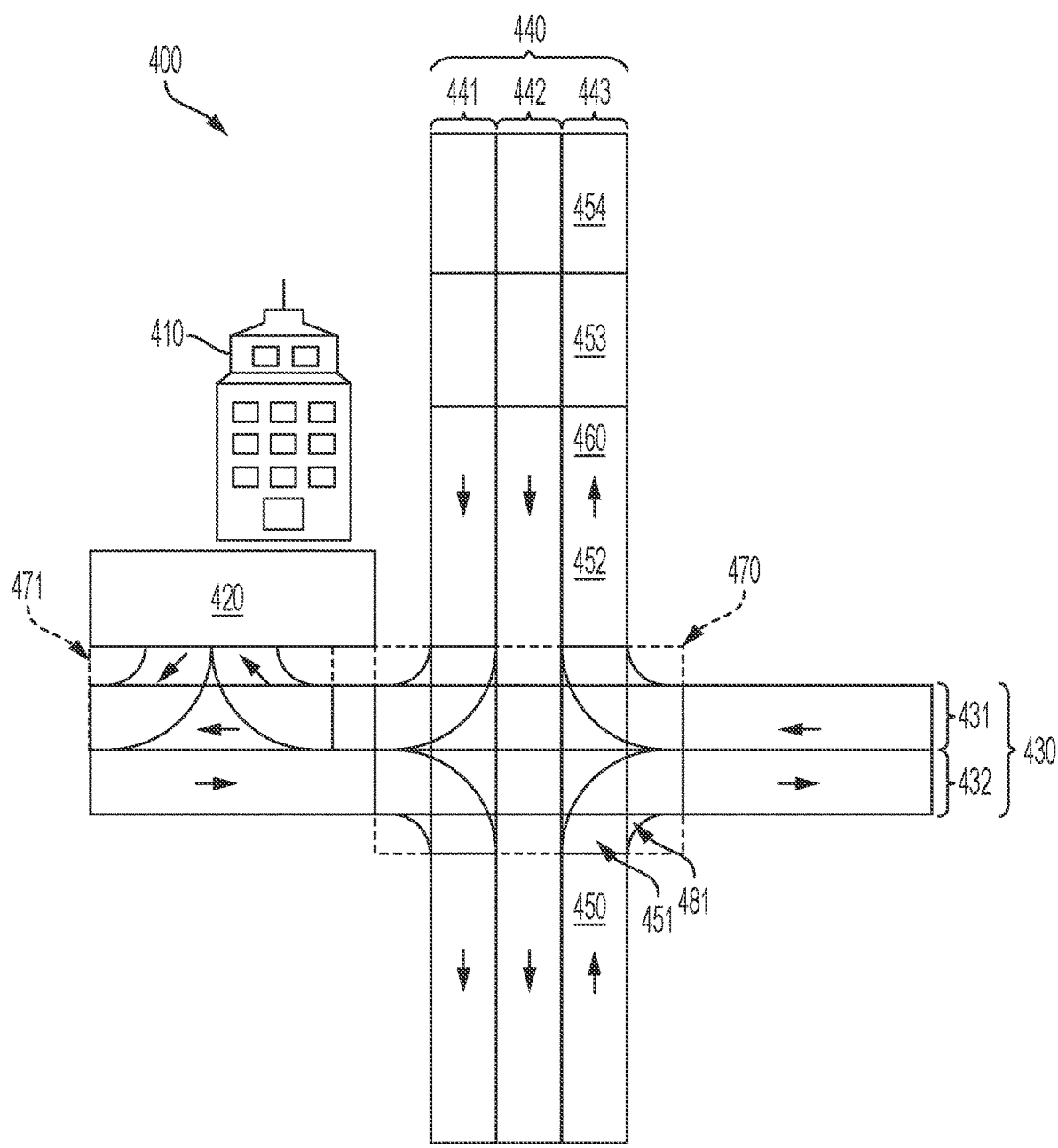
FIG. 4 illustrates a portion of an example road network.

FIG. 4 illustrates a portion of an example road network map 400 that may include one or more unnavigable areas 410, such as a building, one or more navigable areas, such as parking lot 420, roads 430 and 440, or a combination thereof. In some embodiments, the road network information may also include control information, such as direction of travel information, speed limit information, toll information, grade information, such as inclination or angle information, surface material information, aesthetic information, or a combination thereof.

The roads in the road network may include one or more lanes. For example, the road 430 in FIG. 4 comprises the lanes 431 and 432, and the road 440 comprises the lanes 441, 442, and 443. The lanes may be divided into a plurality of lane segments; for example, the lane 443 comprises consecutive lane segments 450, 451, 452, and 453. Each lane segment has an associated direction of travel, which is indicated by the arrows in FIG. 4. For example, the arrow 460 indicates the direction of travel in lane segment 452. The road network also includes intersections which comprise a plurality of lane segments that connect different roads or navigable areas. For example, intersection 470 connects roads 430 and 440, and intersection 471 connects the parking lot 420 to the road 430. Lane segment 450 has two successor lane segments in intersection 470-451 and 481. Lane segment 451 continues lane 443 in road 440, but the other successor lane segment 481 turns right and connects to lane 432 in the crossing road 430.

In some embodiments, receiving the road network information may include transcoding or reformatting the road network information, storing the reformatted road network information, or both. For example, the road network information may be used to create a graph representation of a road network as a vector map, a curvilinear map, a cartesian map, or the like.

The system may then identify (312) a starting point within the geographical area. For example, the system may identify a starting point as a current or future location of the autonomous vehicle. Alternatively and/or additionally, a user may provide the starting point to the system. In certain embodiments, identifying the starting point may include identifying a road, a lane, or other point within the received road network.

At 313, the system may identify a destination within the geographical area. The system may identify a destination within the geographical area, by for example, receiving user instructions including the destination; based on user information (e.g., if a user travels to the same destination at a certain time, or has a calendar entry for traveling to a destination); or the like. In certain embodiments, identifying the destination may include identifying a road, a lane, or other point within the received road network.

In some embodiments, a nominal route from the starting point to the destination through the road network may be generated at 314. In some embodiments, a nominal route may represent a unique or distinct route through the road network from the starting point to the destination determined before actual trajectory generation and does not take into account real-time perception information relating to the environment of the autonomous vehicle. This nominal route may be optimal with respect to a cost/reward function based solely on information in the road network; however, because it is generated with limited information, the nominal route is not necessarily the best or most optimal route between the starting point and destination considering all factors, such as blockages due to double-parked vehicles that are unobservable at time of nominal route generation. In certain embodiments, the nominal route may include some temporally and spatially coarse information about traffic conditions, or other environmental conditions. However, such coarse information does not include high-resolution information about dynamic conditions that is only perceivable once an autonomous vehicle arrives at the location (such as an obstruction due to a double parked vehicle).

Figure 5A:
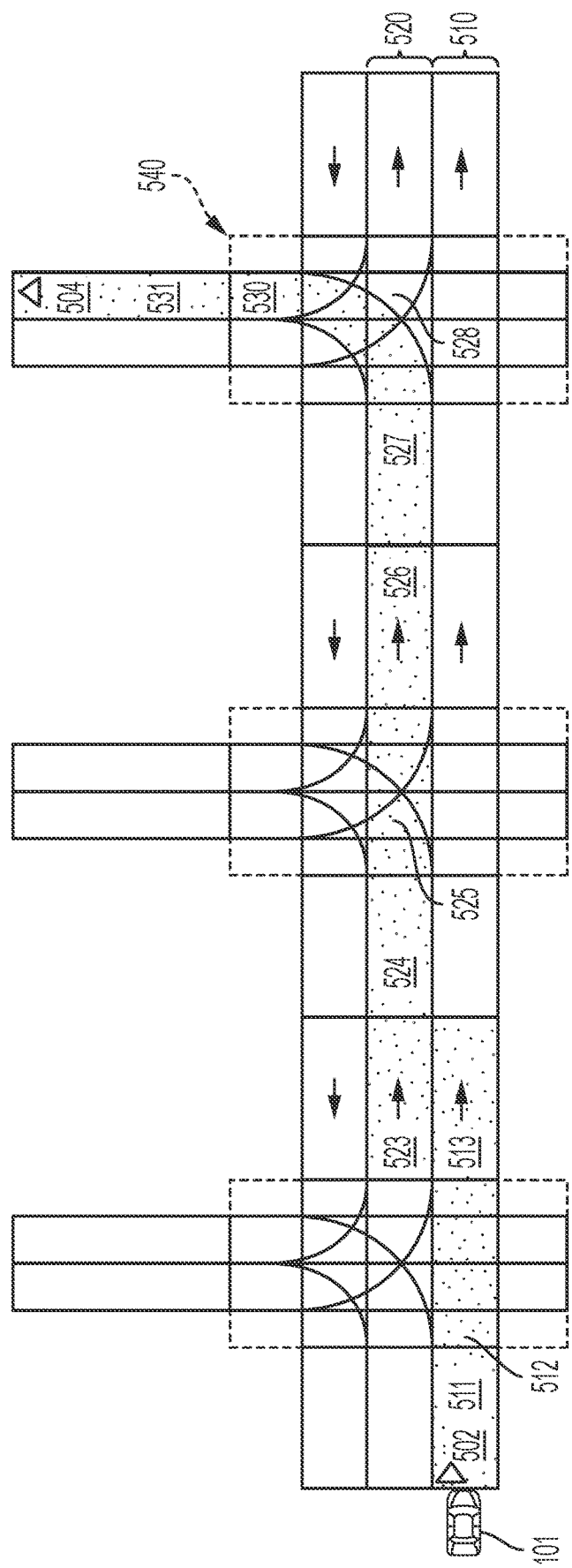
FIG. 5A illustrates an example optimal route generated from a start position to a destination.

As shown in FIG. 5A, the nominal route 500 between a starting point 502 and a destination 504 include a unique or distinct combination of lane segments. As shown in FIG. 5A, the nominal route 500 may require the autonomous vehicle to perform lane changes between lanes 510 and 520, the nominal path includes only one lane at any given point. Specifically, the nominal path 500 requires that autonomous vehicle may traverse, in sequence, the lane segments 511, 512, and 513, execute a lane change between lane segments 513 and 523, and then continue lane segments 523, 524, 525, 526, and 527, traverse the intersection 540 at lane segment 528 to arrive at the destination 504. The lane change location between lane segments 513 and 523 in the nominal route 500 may be arbitrary determined based on, for example, distance to the intersection 540 without taking into account real-time perception information. Furthermore, lane segments 512, 525, and 528 are lane segments in intersections where executing a lane change is not permitted.

As discussed above, to generate the nominal route, the system may first identify candidate routes that a vehicle can travel on to get from the start position to the destination. The system may the score the candidate routes and identify a nominal route to reach the destination. For example, the system may generate a nominal route that minimizes Euclidean distance traveled, trip duration, or other cost function during the route. Depending on implementation, the system may generate one or more routes using various routing methods, such as Dijkstra's algorithm, Bellman-Ford algorithm, or other algorithms. The routing module 112(*b*) may also use the traffic information to generate a navigation route that reflects expected conditions of the route (e.g., current day of the week or current time of day, etc.), such that a route generated for travel during rush-hour may differ from a route generated for travel late at night.

After generation of the nominal route, the system may generate 315 an expanded route representation through the road network, to include neighboring lane segments and contingency routes through intersections (around the nominal route). Neighboring lane segments are adjacent to lane segments included in the nominal route, and which have the same direction of travel and belong to the same road as the lane segments included in the nominal route. Any number of neighboring lane segments may be added to generate the expanded route representation (e.g., 1, 2, 3, 4, or the like). Neighboring lane segments may be added for multiple lanes beyond the lanes that are immediately adjacent to the nominal route. For example, if a nominal route passes through a single lane in a road with 4 lanes in the same direction of travel, the expanded route may include lane segments in all four lanes, not just the one or two immediately adjacent lanes. Contingency lane segments or routes allow the autonomous vehicle to continue on the route even if the nominal route is not followed, and may be part of another route (including alternate intersections and lane segments) between the starting point and the destination. For example, if the autonomous vehicle misses a turn, intersection, etc. the contingency lane segments form part of an alternate route to reach the destination. Any number of contingency lane segments or routes may be added to generate the expanded route representation (e.g., 1, 2, 3, 4, or the like).

Figure 5B:
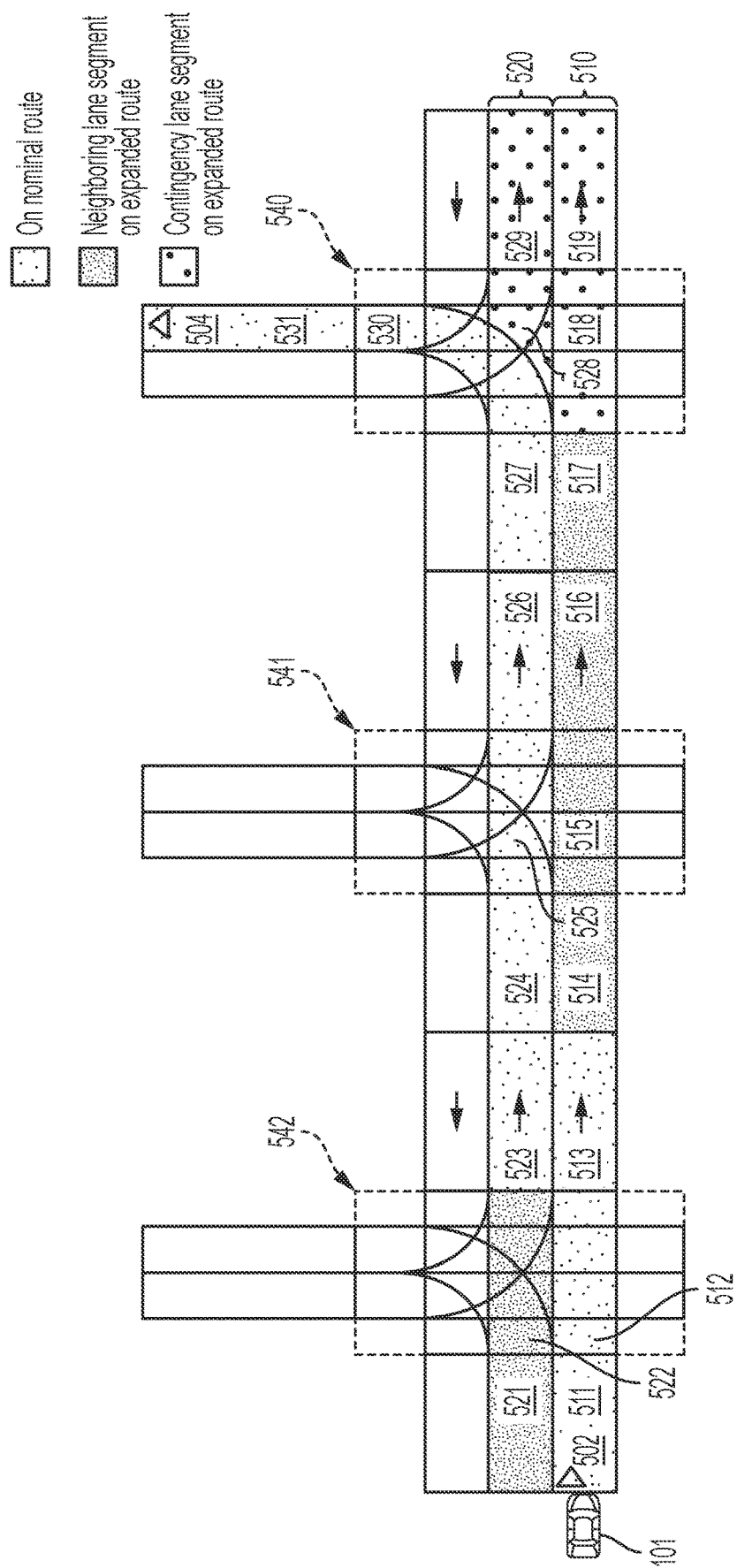
FIG. 5B illustrates a portion of an example expanded route representation around the optimal route of FIG. 5A.

For example, as shown in FIG. 5B, the nominal route 500 of FIG. 5A may be expanded to include neighboring lane segments 521, 522, 514, 515, 516, and 517, as well as contingency lane segments 518 and 519 (in case the autonomous vehicle fails to make the lane change from lane 510 to 520), and contingency lane segments 528 and 529 (in case the autonomous vehicle fails to execute a turn by taking lane segment 530 through the intersection 540). Such contingency extensions to corridors 510 and 520 enable the autonomous vehicle to remain on the route in situations when it fails to make a required lane change or turn, until it is successfully re-routed. Lane changes are permissible from lane segments 511 to 521, lane segments 513 and/or 514 to 523 and/or 524, and lane segments 516 and/or 517 to 526 and/or 527. The expanded route representation may also include lane segments in intersections (512 to 522, 515 to 525, and 518 to 528), where lane change is not permitted.

Finally, the system may compute 316 a static cost (or "cost to go") associated with each lane segment included in the expanded route representation. The cost is static because it does not change during the motion of the autonomous vehicle (i.e., does not take into account information relating to real-time perception. The static cost represents the cost of traveling through a lane segment. It can represent, among other things, the distance remaining to the goal, and the likelihood of completing the route. The likelihood of completing the route may be based on, forexample, the number of required unprotected turns and/or lane changes, and the likelihood of completing those turns and lane changes. The likelihood of success for a lane change may be estimated in part based on the distance remaining to complete the lane change; a short distance remaining to complete a lane change indicates a lower likelihood of success and thus a higher static cost. The presence of traffic controls may also affect the estimated likelihood of lane change success and static cost; a lane change is more likely to succeed immediately following a protected turn at an intersection.

Static cost may be used during trajectory generation phase to plan, among other things, where to execute lane changes (discussed below). For example, the cost associated with each lane segment may progressively increase from lane segments 513-517 of lane 510 to incentivize the autonomous vehicle to execute a lane change from lane 510 to lane 520 before the intersection 540. Similarly, the cost associated with contingency lane segments is high compared to any of the previous lane segments to incentivize the autonomous vehicle to stay on the nominal route 500 and make a turn at the intersection 540.

In the above nominal path determination, the system may determine that certain lane changes are required. For example, lane change between lane segments 513 and 523 is required to allow the autonomous vehicle to traverse the intersection 540 at lane segment 528. However, as discussed above, determination of lane change locations far in advance, and without taking into consideration real-time perception and prediction information may lead to issues such as, without limitation, missed lane change opportunities (e.g., if another vehicle is occupying lane segment 523 when the autonomous vehicle needs to make a lane change between lane segments 513 and 523), sub-optimal lane change location (e.g., autonomous vehicle may get stuck behind a stopped vehicle after executing a lane change between lane segments 513 and 523), absence of contingency maneuvers, or the like.

In order to overcome the above issues of relying on the nominal route alone for moving the autonomous vehicle from the starting position to the destination, the system may generate 320 a continuous multi-corridor representation corresponding to the nominal route 500 in the second phase. The second phase may be executed about 1-2 times per second as the autonomous vehicle travels on the nominal route generated in the first phase. While the current disclosure describes executing the second phase 1-2 times per second, the disclosure is not so limiting and it may be executed at less or more frequency such as, without limitation, 2-4 times, 5-10 times per second, once every 2 seconds, once every 3 seconds, or the like, depending on real-time perception information, user instructions, or the like.

For generating the continuous multi-corridor representation, the system may track progress of the autonomous vehicle as it travels along the nominal route 321, and determine a local region around the tracked location along the route. In certain embodiments, the local region may extend a first distance ahead of the autonomous vehicle and a second distance behind the autonomous vehicle, and determined based on a current location of the autonomous vehicle along the nominal route. For example, the local region may include an interval of about 100-200 m, about 125-175 m, or about 150 m ahead of an autonomous vehicle's current location, and about 20-80 m, about 30-70 m, about 40-60 m, or about 50 m behind an autonomous vehicle's current location.

At 322, the system may convert the local region of the expanded route representation into a continuous multi-corridor representation. The multi-corridor representation of a local region around an autonomous vehicle may include the current corridor of the autonomous vehicle's current location, as well as right and/or left adjacent corridors. Each corridor in the multi-corridor representation may include a continuous sequence of lane segments included in a single lane within the local region of the expanded route representation that are stitched together to form a corridor. Specifically, each corridor includes stitched local lane geometry without lane segments demarcation (including lane marks and drivable area boundaries). Each corridor may also include a smooth, naturalistic reference path. The reference path is representative of the nominal driving path of the autonomous vehicle in that corridor—e.g., centerline of the lane, and a reference for curvilinear coordinates. In certain embodiments, the reference paths may be computed using, for example, spline optimization.

Optionally, each corridor may also include the start and/or end locations of the lane segments included in the corridor, where relevant to navigation. For example, some lane segments locations indicate the start and end of intersections in the corridor. The boundaries between the corridors of the multi-corridor representation may also include permissible lane change regions where lane change is allowed.

While the current disclosure describes corridors as stitched lane segments of a lane, the disclosure is not so limiting, and a corridor may include continuous adjacent regions that are not lanes of a road network.

The continuous multi-corridor representation may also include connections between corridors where merging between corridors (i.e., lane change) is permitted, represented as continuous ranges instead of discrete lane segments, and a continuous "cost to go" representation, adapted from the route.

Figure 5C:
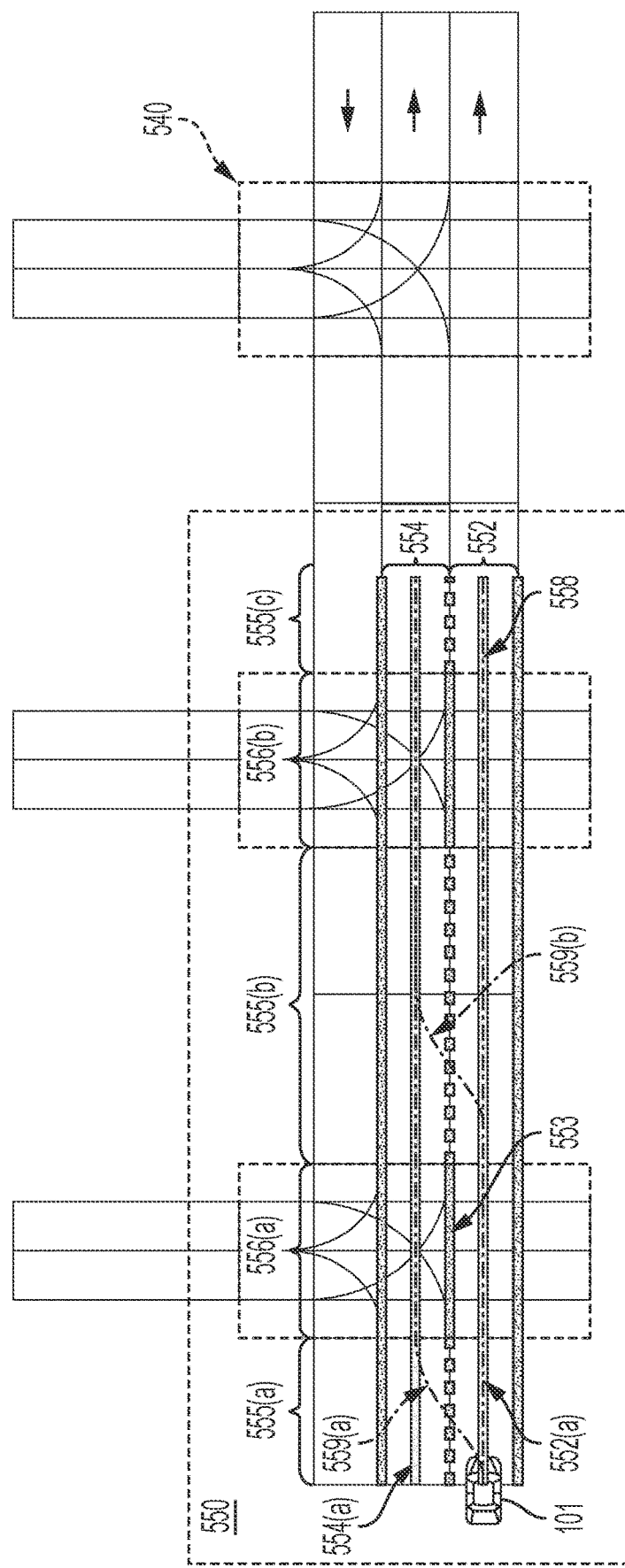
FIG. 5C illustrates an example multi-corridor representation in a first local region of an autonomous vehicle.

An example multi-corridor representation of a local region 550 generated from the extended representation of FIG. 5B is shown in FIG. 5C. As shown in FIG. 5C, the local region 550 corresponds to an area when the autonomous vehicle is at the start location 502. The local region 550 includes two corridors 552 and 554, corresponding to the lanes 510 and 520 respectively. Corridor 552 is created by stitching together lane segments 511-516, and corridor 554 is formed by stitching together lane segments 521-526. The corridors 552 and 554 include lane demarcation 553 between the corridors and drivable area boundaries. Furthermore, the corridors 552 and 554 may include reference paths 552(*a*) and 554(*a*) representative of the nominal driving paths within each corridor. The lane demarcation 553 between the corridors 552 and 554 may also include multiple continuous permissible lane change regions 555(*a*), 555(*b*), 555(*c*), etc. separated by intersections 556(*a*) and 556(*b*) where lane changes are not allowed.

Figure 5D:
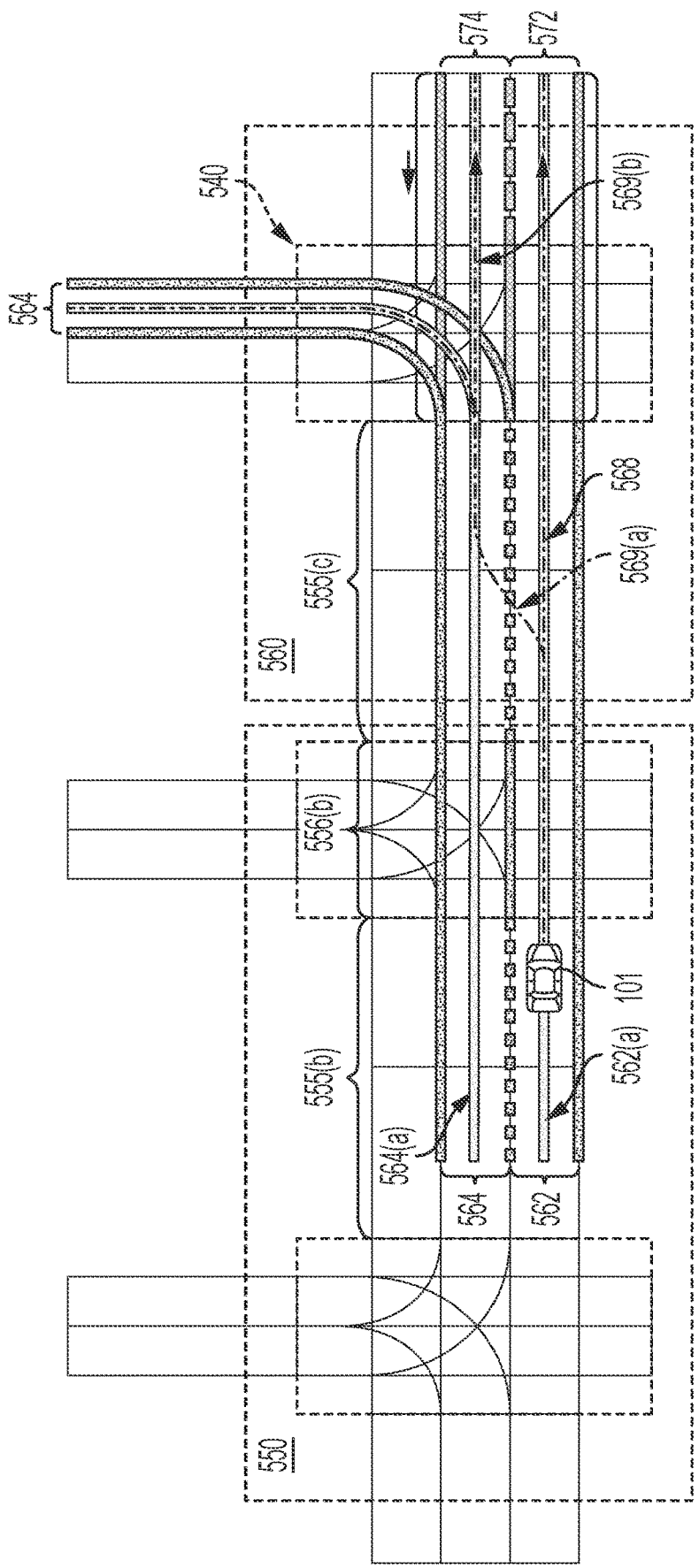
FIG. 5D illustrates an example multi-corridor representation in a second local region of an autonomous vehicle.

FIG. 5D illustrates a multi-corridor representation of a local region 570 generated from the extended representation of FIG. 5B when the autonomous vehicle is past the first intersection 556(*a*). The local region 560 includes two corridors 562 and 564, corresponding to the lanes 510 and 520 respectively. Corridor 562 is created by stitching together lane segments 513-519, and corridor 564 is formed by stitching together lane segments 523-529. The corridors 562 and 564 include lane demarcation 563 between the corridors and drivable area boundaries. Furthermore, the corridors 562 and 564 may include reference paths 562(*a*) and 564(*a*) representative of the nominal driving paths within each corridor. The lane demarcation 563 between the corridors 562 and 564 may also include multiple continuous permissible lane change regions 555(*b*) and 555(*c*), etc. separated by intersection 556(*b*) where lane changes are not allowed.

Trajectory generation (as discussed below) requires repeated distance calculation to the road network boundaries (including lane marks and drivable area), and the cost of these calculations increases with the size of boundary data. The multi-corridor representation reduces computation by limiting boundary data size to the relevant local region. It avoids the expense of Trajectory generation needing to extract boundary data from the entire road network, and potentially extracting more than is relevant.

In the third phase, the system may generate a trajectory (330), for each local region around a vehicle's current location and represented as a multi-corridor representation, the system may generate the vehicle trajectory for traversing that local region by staying in its current lane. The third phase may be executed at a frequency of about 10-15 times per second. Trajectory generation may be performed by using the static cost computed in step 316 for lane segments of each corridor in the local map in conjunction with the perception information. While the current disclosure describes executing the second phase 10-15 times per second, the disclosure is not so limiting and it may be executed at less or more frequency such as, without limitation, 15-20 times, 20-25 times per second, 8-10 times per second, 5-7 times per second, or the like, depending on real-time perception information, user instructions, or the like.

At 331, the system may generate a first candidate trajectory corresponding to the autonomous vehicle staying in lane (i.e., traverse the local region in one corridor—the current corridor).

The system may also generate 332 one or more candidate trajectories corresponding to the autonomous vehicle executing a lane change (i.e., traverse the local region by moving from one corridor to another—current corridor to left/right/or another corridor included in the multi-corridor representation). Each lane change trajectory may be associated with the destination corridor and a lane change location.

Candidate trajectories may be generated using any now or hereafter known methods. For example, candidate trajectories may be generated by computing constraints for lane mark and drivable area boundaries, perceived static and dynamic objects in the environment, etc., and optimizing a dynamically feasible and comfortable trajectory for the autonomous vehicle using model-predictive control, or another algorithm.

If the identified vehicle trajectory includes a lane change maneuver, the system may also identify the location of the lane change maneuver by determining the transition start and end points on the reference paths of the origin and destination corridor, and generating a smooth transition between these points The system may then compute (333) dynamic costs associated with each of the candidate trajectories and identify (334) the candidate trajectory that has the minimum dynamic cost as the vehicle trajectory to be used for traversing the local region. The dynamic cost may be computed based on for example, the real-time perception information of the autonomous vehicle, location and predicted trajectories of objects in the autonomous vehicle's environment, locations of intersections in the corridors, passenger safety and comfort, location of permissible lane change regions in the corridors, the lane change location of that reference trajectory, static costs associated with various lane segments, the optimal route, contingency lane segments, or the like.

For example, if a reference trajectory will take the autonomous vehicle into the path of another vehicle (based on the other vehicle's predicted trajectory), such a trajectory may be discarded as being too costly to execute. Similarly, a trajectory that requires the autonomous vehicle to make jerky movements during lane change may be discarded by assigning it a higher cost with respect to passenger comfort. In another example, the presence of another vehicle in a permissible lane change region in FIG. 5C may increase the cost of a lane change trajectory and the system may select the stay in lane trajectory as the best trajectory for traversing the local region of FIG. 5C. The stay-in-lane trajectory 558 for local region 550 shown in FIG. 5C, and the stay-in-lane trajectory 568 for local region 560 is shown in FIG. 5D. Similarly, two of the possible lane change trajectories 559(a) and 559(b) are shown in FIG. 5D.

On the other hand, in the local region of FIG. 5D, the stay in lane trajectory cost may be very high and the system may identify a lane change trajectory as the better trajectory. The lane change trajectory that is associated with a suitable destination corridor and a lane change location that has the minimal dynamic cost may be chosen. For example, for the local region 550 of FIG. 5C, a first lane change trajectory 559(a) may include a lane change location in region 555(a) and a second lane change trajectory 559(b) may include a lane change location in region 555(b). If another vehicle is predicted to be in the corridor 554 at lane change location 555(a), the system may determine that the cost of the lane change trajectory 559(a) is high and choose the lane change trajectory 559(b) as the vehicle trajectory for local region 550 (assuming the cost of lane trajectory 559(b) is lower).

The system may repeat the phases 310, 320, and 330 until the autonomous vehicle reaches the destination.

It should be noted that FIGS. 4 and 5A-5D are example simplified representations and the disclosure is not so limiting.

As discussed above, use of dynamic multi-corridor representations of local regions allows the system to make decisions regarding when and where to perform lane changes during trajectory generation dynamically and taking into account perception information (instead of at the higher level route planner step before the vehicle is in motion). This also provides the largest possible window in which the autonomous vehicle can safely execute a lane change while also performing the lane change as soon as possible. The system, therefore, never commits to a lane change location and may consider alternative lane change locations without re-routing. Finally, the system may generate complete trajectories for lane changes versus staying in lane options for each local region and may decide the best trajectory for the autonomous vehicle based on scoring instead of just relying on heuristics. The system predictions may also improve over time by self-learning to allow for making accurate lane change decisions in high traffic or other complex situations.

In addition to generating a trajectory for lane changes, the use of contingency corridors in the multi-corridor representation may also be used to ensure that the system never commits to taking the nominal route through an intersection when doing so would be an unacceptable risk. The contingency corridor may provide a lower-risk alternative route through the intersection when necessary. When a contingency corridor is taken, the system may continue to operate as normal because the autonomous vehicle is still on the expanded route. Provided the contingency corridor is sufficiently long the system can re-route to the goal before the autonomous vehicle reaches the end of the contingency corridor.

Figure 6:
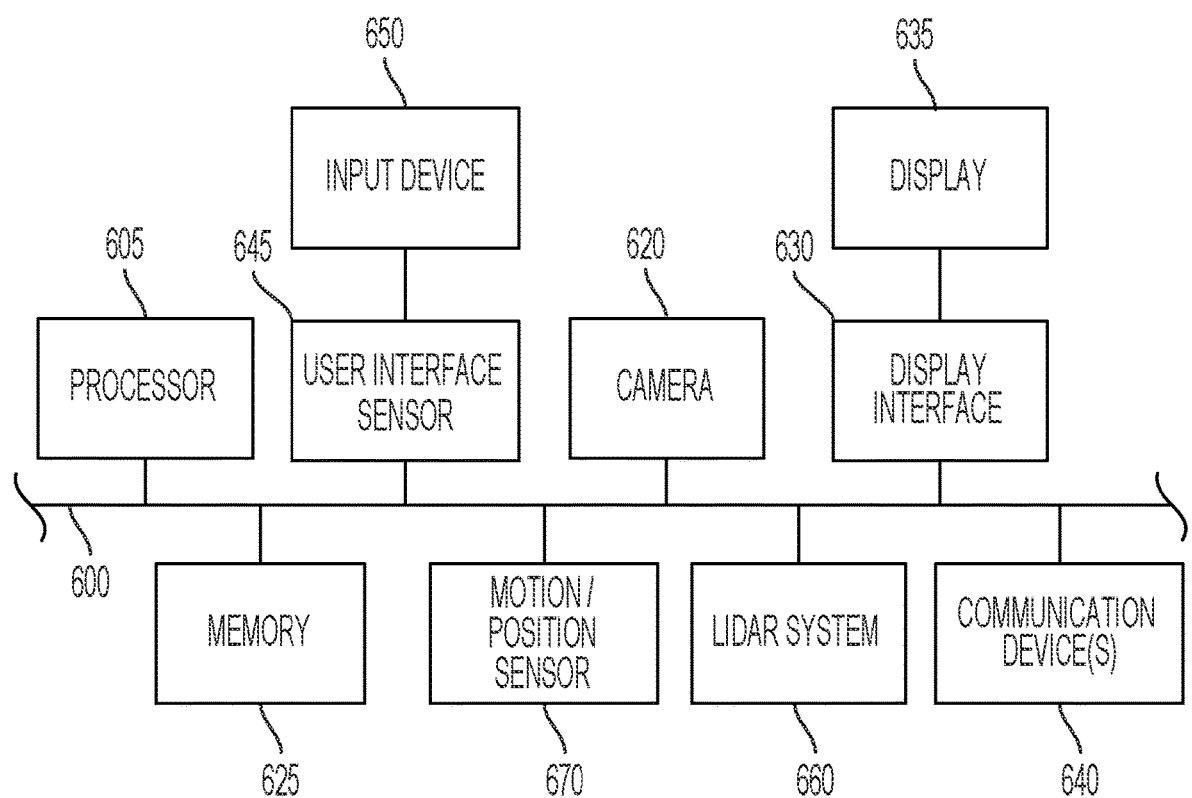
FIG. 6 is a block diagram of elements of a computing device on which the various systems and methods in this document could be implemented.

FIG. 6 depicts an example of internal hardware that may be included in any of the electronic components of the system, such as the controller (or components of the controller) of the autonomous vehicle, the control system, servers etc. described above. An electrical bus 600 serves as an information highway interconnecting the other illustrated components of the hardware. Processor 605 is a central processing device of the system, configured to perform calculations and logic operations required to execute programming instructions. As used in this document and in the claims, the terms "processor" and "processing device" may refer to a single processor or any number of processors in a set of processors that collectively perform a set of operations, such as a central processing unit (CPU), a graphics processing unit (GPU), a remote server, or a combination of these. Read only memory (ROM), random access memory (RAM), flash memory, hard drives and other devices capable of storing electronic data constitute examples of memory devices 625. A memory device may include a single device or a collection of devices across which data and/or instructions are stored. Various embodiments of the invention may include a computer-readable medium containing programming instructions that are configured to cause one or more processors, print devices and/or scanning devices to perform the functions described in the context of the previous figures.

An optional display interface 630 may permit information from the bus 600 to be displayed on a display device 635 in visual, graphic or alphanumeric format. An audio interface and audio output (such as a speaker) also may be provided. Communication with external devices may occur using various communication devices 640 such as a wireless antenna, an RFID tag and/or short-range or near-field communication transceiver, each of which may optionally communicatively connect with other components of the device via one or more communication system. The communication device(s) 640 may be configured to be communicatively connected to a communications network, such as the Internet, a local area network or a cellular telephone data network.

The hardware may also include a user interface sensor 645 that allows for receipt of data from input devices 650 such as a keyboard, a mouse, a joystick, a touchscreen, a touch pad, a remote control, a pointing device and/or microphone. Digital image frames also may be received from a camera 620 that can capture video and/or still images. The system also may receive data from a motion and/or position sensor 670 such as an accelerometer, gyroscope or inertial measurement unit. The system also may receive data from a LiDAR system 660 such as that described earlier in this document.

The above-disclosed features and functions, as well as alternatives, may be combined into many other different systems or applications. Various components may be implemented in hardware or software or embedded software. Various presently unforeseen or unanticipated alternatives, modifications, variations or improvements may be made by those skilled in the art, each of which is also intended to be encompassed by the disclosed embodiments.

Terminology that is relevant to the disclosure provided above includes:

An "automated device" or "robotic device" refers to an electronic device that includes a processor, programming instructions, and one or more components that based on commands from the processor can perform at least some operations or tasks with minimal or no human intervention. For example, an automated device may perform one or more automatic functions or function sets. Examples of such operations, functions or tasks may include without, limitation, navigation, transportation, driving, delivering, loading, unloading, medical-related processes, construction-related processes, and/or the like. Example automated devices may include, without limitation, autonomous vehicles, drones and other autonomous robotic devices.

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" or AV is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle. The autonomous vehicle can be a ground-based autonomous vehicle (e.g., car, truck, bus, etc.), an air-based autonomous vehicle (e.g., airplane, drone, helicopter, or other aircraft), or other types of vehicles (e.g., watercraft).

In this document, when terms such "first" and "second" are used to modify a noun, such use is simply intended to distinguish one item from another, and is not intended to require a sequential order unless specifically stated. In addition, terms of relative position such as "vertical" and "horizontal", or "front" and "rear", when used, are intended to be relative to each other and need not be absolute, and only refer to one possible position of the device associated with those terms depending on the device's orientation.

The invention claimed is:

1. A method of maneuvering an autonomous vehicle, the method comprising:
    generating a multi-corridor representation corresponding to a local region around the autonomous vehicle while travelling on a route, the multi-corridor representation comprising a plurality of adjacent corridors that each include one or more lane segments of a road network;
    generating, using the multi-corridor representation and perception data corresponding to the local region, a trajectory for the autonomous vehicle to traverse the local region, wherein a location of executing a lane change along the route is determined dynamically during a trajectory generation phase based on the perception data;
    generating a stay-in-lane candidate trajectory for the autonomous vehicle to stay in a current corridor in the local region;
    generating one or more lane change candidate trajectories for the autonomous vehicle to change from the current corridor to a destination corridor using a permissible lane change region between the current corridor and the destination corridor, wherein the permissible lane change region is associated with a continuous cost-to-go;
    using the perception data and the continuous cost-to-go associated with the permissible lane change region to determine a dynamic cost associated with each of the following: the stay-in-lane candidate trajectory and the one or more lane change candidate trajectories, wherein the dynamic cost is associated with passenger comfort and safety; and
identifying the trajectory for the autonomous vehicle to traverse the local region as a candidate trajectory that has a minimum dynamic cost.

2. The method of claim 1, wherein the one or more lane segments of the road network are stitched together without lane demarcation.

3. The method of claim 2, wherein a boundary between a pair of adjacent corridors of the plurality of adjacent corridors includes one or more permissible lane change regions where the autonomous vehicle can execute the lane change.

4. The method of claim 3, wherein generating the trajectory comprises:
receiving a static cost associated with each of the one or more lane segments, the static cost being associated with a lane change to be executed by the autonomous vehicle while travelling on the route; and
using the static cost to identify the one or more permissible lane change regions.

5. The method of claim 4, wherein the static cost associated with a lane segment is based on information included in a road network map without taking into account the perception data.

6. The method of claim 2, further comprising identifying the one or more lane segments of the road network by:
generating the route comprising a plurality of consecutive lane segments;
identifying a neighboring lane segment corresponding to one or more of the plurality of consecutive lane segments; and
identifying the one or more lane segments as a subset of the plurality of consecutive lane segments and the neighboring lane segment, the subset being associated with the local region.

7. The method of claim 2, further comprising generating a reference path along which the autonomous vehicle will travel in each corridor.

8. The method of claim 1, further comprising repeating the generation of the multi-corridor representation and the generation of the trajectory steps for a plurality of local regions until the autonomous vehicle reaches a destination.

9. The method of claim 1, wherein the dynamic cost is increased responsive to the associated trajectory is associated with a jerky movement of the autonomous vehicle.

10. A system for maneuvering an autonomous vehicle, the system comprising: a processor; and
a non-transitory computer-readable medium comprising programming instructions that when executed by the processor will cause the processor to:
generate a multi-corridor representation corresponding to a local region around the autonomous vehicle while travelling on a route, the multi-corridor representation comprising a plurality of adjacent corridors that each include one or more lane segments of a road network,
generate, using the multi-corridor representation and perception data corresponding to the local region, a trajectory for the autonomous vehicle to traverse the local region, wherein a location of executing a lane change along the route is determined dynamically during a trajectory generation phase based on the perception data,
generate a stay-in-lane candidate trajectory for the autonomous vehicle to stay in a current corridor in the local region,
generate one or more lane change candidate trajectories for the autonomous vehicle to change from the current corridor to a destination corridor using a permissible lane change region between the current corridor and the destination corridor, wherein the permissible lane change region is associated with a continuous cost-to-go,
use the perception data and the continuous cost-to-go associated with the permissible lane change region to determine a dynamic cost associated with each of the following: the stay-in-lane candidate trajectory and the one or more lane change candidate trajectories, wherein the dynamic cost is associated with passenger comfort, and
identify the trajectory for the autonomous vehicle to traverse the local region as a candidate trajectory that has a minimum dynamic cost.

11. The system of claim 10, wherein the one or more lane segments of the road network are stitched together without lane demarcation.

12. The system of claim 11, wherein a boundary between a pair of adjacent corridors of the plurality of adjacent corridors includes one or more permissible lane change regions where the autonomous vehicle can execute the lane change.

13. The system of claim 12, wherein the programming instructions that when executed by the processor will cause the processor to generate the trajectory comprise programming instructions to cause the processor to:
receive a static cost associated with each of the one or more lane segments, the static cost being associated with a lane change to be executed by the autonomous vehicle while travelling on the route; and
use the static cost to identify the one or more permissible lane change regions.

14. The system of claim 13, wherein the static cost associated with a lane segment is based on information included in a road network map without taking into account the perception data.

15. The system of claim 10, wherein the dynamic cost is increased responsive to the associated trajectory is associated with a jerky movement of the autonomous vehicle.

16. The system of claim 11, further comprising programming instructions that when executed by the processor will cause the processor to identify the one or more lane segments of the road network by:
generating the route comprising a plurality of consecutive lane segments;
identifying a neighboring lane segment corresponding to one or more of the plurality of consecutive lane segments; and
identifying the one or more lane segments as a subset of the plurality of consecutive lane segments and the neighboring lane segment, the subset being associated with the local region.

17. The system of claim 11, further comprising programming instructions that when executed by the processor will cause the processor to generate a reference path along which the autonomous vehicle will travel in each corridor.

18. The system of claim 10, further comprising programming instructions that when executed by the processor will cause the processor to repeat the generation of the multi-corridor representation and the generation of the trajectory steps for a plurality of local regions until the autonomous vehicle reaches a destination.

19. A non-transitory computer-readable medium comprising programming instructions, when executed by a processor, cause the processor to:
- generate a multi-corridor representation corresponding to a local region around the autonomous vehicle while travelling on a route, the multi-corridor representation comprising a plurality of adjacent corridors that each include one or more lane segments of a road network,
- generate, using the multi-corridor representation and perception data corresponding to the local region, a trajectory for the autonomous vehicle to traverse the local region, wherein a location of executing a lane change along the route is determined dynamically during a trajectory generation phase based on the perception data,
- generate a stay-in-lane candidate trajectory for the autonomous vehicle to stay in a current corridor in the local region,
- generate one or more lane change candidate trajectories for the autonomous vehicle to change from the current corridor to a destination corridor using a permissible lane change region between the current corridor and the destination corridor, wherein the permissible lane change region is associated with a continuous cost-to-go,
- use the perception data and the continuous cost-to-go associated with the permissible lane change region to determine a dynamic cost associated with each of the following: the stay-in-lane candidate trajectory and the one or more lane change candidate trajectories, wherein the dynamic cost is associated with passenger comfort, and
- identify the trajectory for the autonomous vehicle to traverse the local region as a candidate trajectory that has a minimum dynamic cost.

* * * * *